United States Patent Office 3,397,960
Patented Aug. 20, 1968

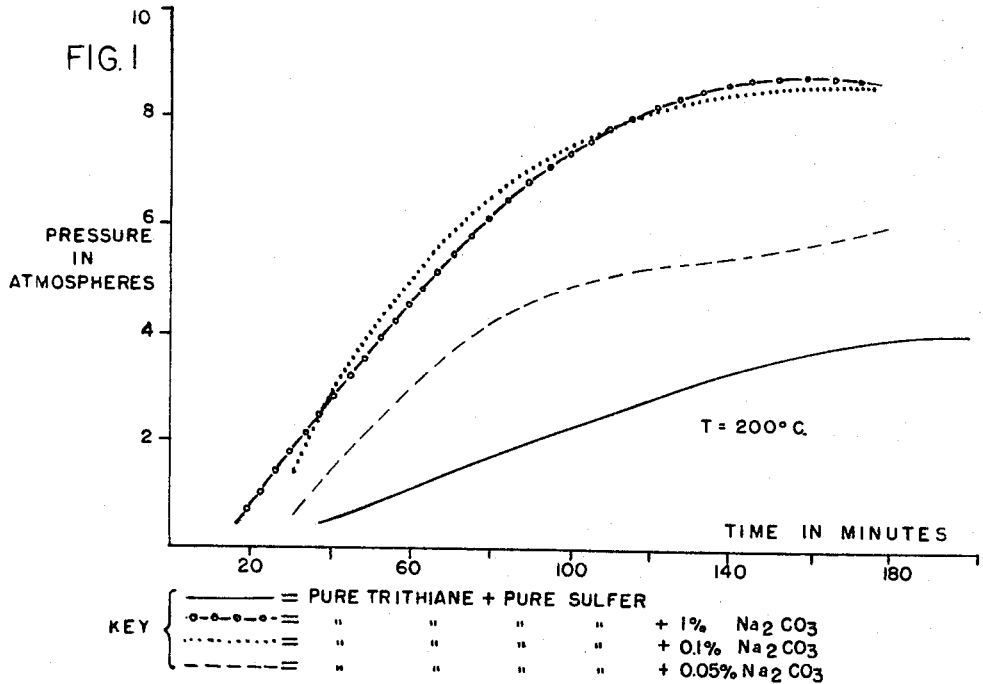
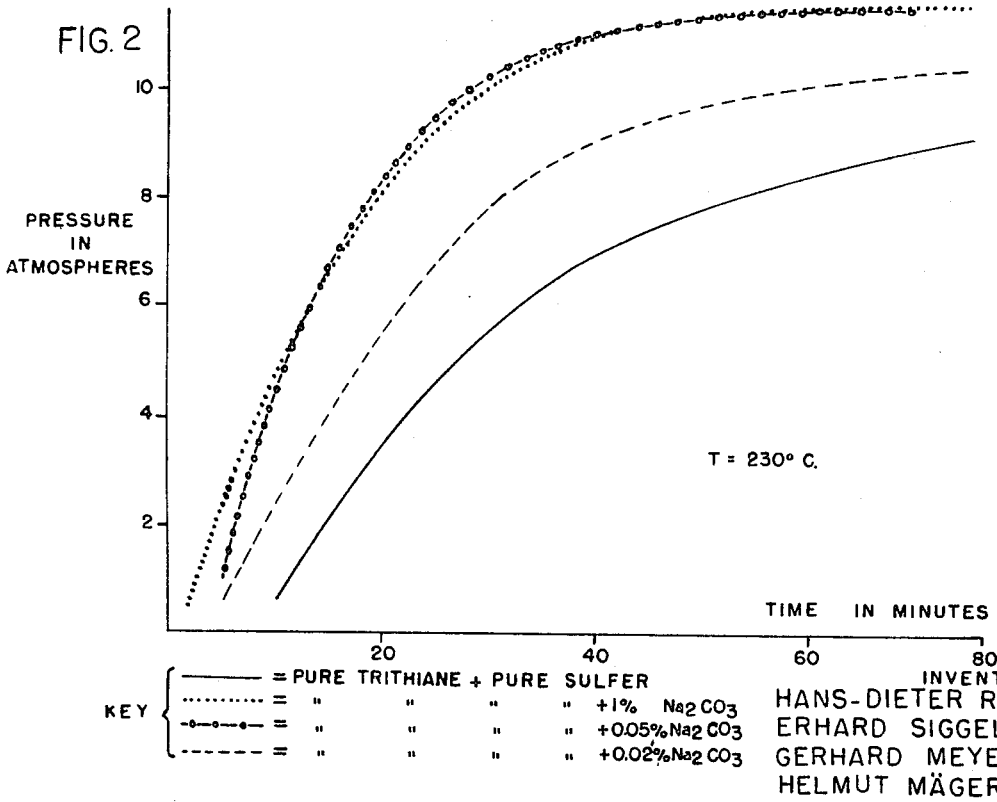

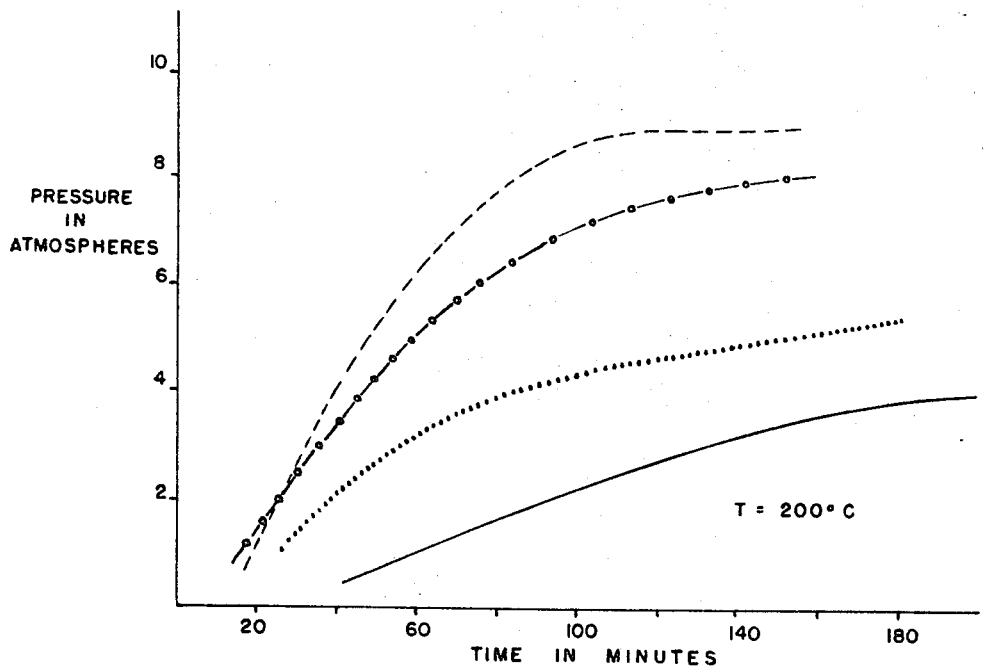

3,397,960
CONVERSION OF TRITHIANE INTO
CARBON DISULFIDE
Hans-Dieter Rupp, Erlenbach, Erhard Siggel, Seckmauern,
Gerhard Meyer, Obernburg, and Helmut Mägerlein,
Erlenbach, Germany, assignors to Glanzstoff AG, Wuppertal, Germany
Continuation-in-part of application Ser. No. 541,481,
Apr. 11, 1966. This application Dec. 5, 1966, Ser.
No. 599,264
Claims priority, application Germany, Dec. 14, 1965,
V 29,923
13 Claims. (Cl. 23—206)

ABSTRACT OF THE DISCLOSURE

This invention relates to a process for the conversion of trithiane into carbon disulfide, and more particularly, the invention is concerned with a process for converting trithiane recovered as a precipitate in rayon spinning baths into carbon disulfide which in turn is reusable in the production of viscose rayon. Especially good results distinguished by a high rate of reaction are achieved by reacting the trithiane with molten sulfur in the presence of alkali and alkaline earth metal compounds as catalysts.

---

This application is a continuation-in-part of copending application, Ser. No. 541,481, filed Apr. 11, 1966, now abandoned.

In the manufacture of viscose rayon, it is possible to use an aqueous spinning bath for regenerating the cellulose and forming filaments which contains formaldehyde in addition to sulfuric acid, sodium sulfate and in some cases other salts. During the spinning process, there is formed in the bath trithiane which is a cyclic trimeric thioformaldehyde of the formula:

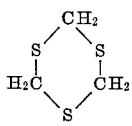

The trithiane precipitates in solid form in the aqueous spinning bath and can be separated therefrom by filtration. Trithiane is not itself useful in the production of rayon and is therefore considered to be a waste product of the spinning process. Over a period of time, this rejection of the trithiane constitutes a considerable economic loss in terms of the relatively large amounts in which this by-product accumulates. Accordingly, it would be very desirable to convert the trithiane by-product into a compound such as carbon disulfide which can be used in the production of viscose rayon.

One object of the present invention is to provide a process for converting trithiane into carbon disulfide which can then be reutilized in the production of viscose rayon, i.e. in the xanthate stage of producing the viscose solution wherein alkali-cellulose is reacted with carbon disulfide.

Another object of the invention is to provide a process for converting trithiane into carbon disulfide which can be carried out at relatively low temperatures and under easily controlled conditions, especially in the presence of a catalyst which permits the conversion reaction to be carried out at a surprisingly high velocity.

Yet another object of the invention is to provide a process for the continuous conversion of trithiane into carbon disulfide, this continuous process being especially useful in combination with the production of viscose rayon.

Other objects and advantages will become more apparent upon consideration of the following detailed description.

It has now been found, in accordance with the present invention, that one can achieve an economical conversion of trithiane into carbon disulfide by reacting the trithiane with molten sulfur at a temperature of about 180° to 250° C., preferably at a temperature of about 220°–230° C., withdrawing the volatilized reaction products and separating carbon disulfide therefrom. It has further been found that this reaction between trithiane and molten sulfur proceeds much more rapidly and with excellent yields if it is carried out in the presence of a catalytic amount of a substantially water-free compound of the formula $MeR_n$ wherein Me denotes an alkaline metal or alkaline earth metal, R denotes oxygen, the hydroxy group (OH) or any organic or inorganic anion, and $n$ denotes an integer of 1 to 2 (depending upon the particular valence of the metal and the anion), with the proviso that such compound must exhibit a pH-value in a normal or standard solution of about equal to or greater than 9. The terms "normal solution" and "standard solution" are used herein with reference to an aqueous solution which contains one equivalent of the catalytic compound in grams in one liter of water.

Suitable catalysts thus include the oxides, hydroxides and preferably the salts of alkali metals or alkaline earth metals, provided however, that one selects a compound which reacts strongly alkaline in aqueous solution, i.e. so that a normal solution of the compound exhibits a pH-value of about 9 to 14. The amount of catalyst added to the reaction is generally about 0.01 to 1% by weight, with reference to the trithiane, preferably about 0.05 to 0.5% by weight. Particularly useful compounds selected from the organic and inorganic salts of alkali metals or alkaline earth metals include the carbonates, phosphates, borates, vanadates, molybdates, aluminates, alcoholates, phenolates and acetylacetonates. Among the alkali or alkaline earth metals, sodium is preferred, other suitable metals include potassium, rubidium, cesium, calcium, strontium, barium, lithium.

The volatilized reaction products consist essentially of carbon disulfide and hydrogen sulfide which can be readily separated from each other by known and conventional methods. The carbon disulfide can be purified, preferably by fractional distillation, and the carbon disulfide recovered in this manner is highly useful for reaction with alkali-cellulose for the production of the viscose solution used in the known spinning process. According to another preferred embodiment of the invention, the hydrogen sulfide is oxidized into sulfur by any conventional process and the resulting sulfur then reused for the conversion of trithiane into carbon disulfide.

It is especially advantageous to carry out the reaction in a continuous operation wherein the molten sulfur is continuously introduced together with the trithiane into a reaction zone maintained at the reaction temperature, with or without the addition of the catalyst, and the vaporous reaction products are then conducted in counter-current flow to molten sulfur such that a substantially complete conversion into carbon disulfide is achieved by the trithiane which is entrained in the countercurrently flowing vapors. A further advantage of the continuous process resides in the fact that it can be carried out at normal pressure, i.e. at approximately 1 atmosphere.

The reaction of the invention proceeds according to the equation:

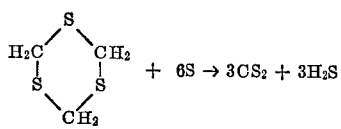

In order to make the process as economical as possible, the hydrogen sulfide obtained as a by-product according to the above equation is oxidized in known manner in a second step after its separation from the carbon disulfide. The sulfur formed by this oxidation of the hydrogen sulfide is then available for use in the reaction with trithiane according to the invention. In this manner, it is possible to recover almost all of the sulfur and carbon content of the trithiane in the form of carbon disulfide.

In carrying out a batch operation, the trithiane can be brought into reaction with the molten sulfur in any suitable closed apparatus such as an autoclave, e.g. under a pressure of up to about 15 atmospheres, preferably up to about 10 atmospheres. The pressure can be maintained at any desired level by releasing the vaporous reaction products until substantially all of the trithiane has been reacted. It is then preferable to degas the autoclave with an inert gas such as nitrogen so as to completely remove all of the reaction products, and the resulting mixture of carbon disulfide and hydrogen sulfide can be cooled below the boiling point of the carbon disulfide so as to separate and recover this desired product in liquid form. The carbon disulfide has to be purified by fractional distillation. The sulfur obtained by oxidation of the hydrogen sulfide can be used directly in subsequent batches.

For carrying out the process of the invention in a continuous manner, it is preferable to employ a vertical reaction vessel equipped with a suitable gas washing unit such as a spray tower, plate scrubber or the like. The trithiane and sulfur are introduced continuously into the reaction vessel which is maintained at a pressure of approximately 1 atmosphere and within the prescribed temperature range of 180–250° C., preferably 220–230° C. The heated mixture of trithiane and sulfur in the reaction vessel is partly converted into carbon disulfide and hydrogen sulfide, and these vaporous reaction products are distilled off over the gas washing unit together with entrained trithiane which may be partly sublimated or vaporized. In the reaction vessel and especially in the gas washing unit, the volatilized constituents are led in countercurrent flow to molten sulfur, so that practically all of the trithiane is converted into carbon disulfide and hydrogen sulfide before removing the vaporous reaction products from the reaction vessel. Molten sulfur is continuously withdrawn from the bottom of the reaction vessel and recycled and introduced as a liquid wash at the top of the vessel, i.e. in the gas washing unit.

It is especially desirable to introduce sulfur in excess, i.e. in excess of the amount theoretically required by the above reaction equation, because the conversion is then accelerated. Any unreacted sulfur can be reused.

When using the water-free alkali metal or alkaline earth metal compound as a catalyst in the process of the invention, it is preferably admixed with at least one of the reactants before heating to the necessary reaction temperature of 180–250° C. Also, the catalytic reaction is most advantageously carried out as a batch operation in an autoclave as discussed above in order to avoid losses due to sublimation. Recovery of the catalyst from the reaction mixture after completion of the reaction is not essential. In a batch or continuous operation, most of the catalyst can be retained or recycled with molten sulfur and fresh catalyst can be added to replace any losses.

The process of the invention is further illustrated by but not restricted to the following examples.

Example 1

100 grams trithiane obtained as a precipitate from a viscose spinning bath and 200 grams sulfur are mixed together and heated in a one-liter glass autoclave at 230° C. After beginning the reaction, the pressure increases up to about 10 atmospheres due to the amounts of carbon disulfide and hydrogen sulfide being formed. This pressure of 10 atm. is maintained by slowly releasing the formed mixture of carbon disulfide-hydrogen sulfide up to the end of the reaction and the autoclave is then degassed by means of nitrogen. Meanwhile, the gas mixture is caused to expand in a cooled receiver so as to recover liquid carbon disulfide separately from the gaseous hydrogen sulfide. 148.5 grams of carbon disulfide are obtained after a single fractional distillation, corresponding to a yield of 90% of theory. The hydrogen sulfide collected as a by-product gas is oxidized into sulfur. There are obtained 62.5 grams sulfur which can be introduced as the next charge for the reaction with trithiane.

Example 2

A finely pulverized mixture of 1 part by weight of trithiane and 1.4 parts by weight of sulfur is continuously introduced by means of a screw conveyor into a 5-liter capacity enameled reactor heated to 230° C., the reactor being provided with a trickling column also heated to 230° C. and filled with Raschig rings. Molten sulfur contained in this column is continuously withdrawn from the bottom and recycled by means of a pump over a filter to the head or top of the column. The resulting gaseous mixture of hydrogen sulfide and carbon disulfide is drawn off at the top of the column, led through a sulfur separator and separated into its components by conventional means. The yield of carbon disulfide is 94.5% of theory. The hydrogen sulfide is oxidized into sulfur which can be reused.

Example 3

In a number of comparative tests, the effect of adding the catalyst to the reaction can be readily compared to the same reaction wherein no catalyst is employed.

(a) 11.5 grams trithiane and 16 grams sulfur are heated to 200° C. in a glass autoclave after first adding 0.012 grams sodium carbonate as the catalyst. The reaction velocity can be observed over a period of time by measuring the pressure which increases due to the formation of the carbon disulfide/hydrogen sulfide gas mixture. After about 150 minutes, the reaction is substantially completed and a pressure of 8.5 atm. prevails in the autoclave. The gas mixture is expanded into a cooled receiver, and carbon disulfide is recovered from this mixture in an amount of 18 grams after a single fractional distillation, corresponding to a yield of 95% of theory. The hydrogen sulfide can be oxidized to sulfur which can then be reintroduced for reaction with trithiane. In a comparative test carried out under exactly the same conditions but without using the catalyst a pressure of only 3.5 atm. prevails after 150 minutes of reaction time. The reaction is then completed only after further heating at the same temperature for another four hours.

(b) A number of comparative tests can be carried out using various catalysts in various amounts so as to achieve a similar improvement in reducing the time required for the reaction. The results of such additional tests are clearly set forth and summarized in the form of curves shown in FIGS. 1, 2 and 3 of the accompanying drawings. In all of these tests, the amounts of trithiane and sulfur employed are the same as in paragraph (a) of this example. The amounts of catalyst are identified on the drawings and are given in percent by weight with reference to the amount of the trithiane reactant. From the illustrated results, it will be apparent that the reaction is dependent not only upon the particular catalyst and its amount but also upon the reaction temperature. The tests of FIGS. 1 and 2 are carried out with the same catalyst but at different temperatures of 200° C. and 230° C., respectively. Other catalysts are illustrated by the curves of FIG. 3 where the reaction temperature is 200° C.

Similar results are achieved when adding the oxides or hydroxides of the alkali or alkaline earth metals to the reaction mixture, and the increase in reaction velocity when using any of the prescribed class of catalysts represents a very desirable and unexpected improvement in the process of the invention. Also, the use of these catalysts generally provides much higher yields, at least in terms of yield within the same reaction time.

Other advantages are attributed to the invention either with or without the addition of the catalyst. In addition to the high yield of carbon disulfide, the process of the invention is especially advantageous in that the reaction of the trithiane with sulfur can be carried out at relatively low temperatures. Furthermore, there is no significant influence on the reaction or the yield when the trithiane reactant is contaminated with impurities originating from the viscose spinning bath, except acids.

Furthermore, the process of the invention is particularly adapted to be used in combination with the viscose spinning process, whereby trithiane as a precipitate in the spinning bath can be continuously converted into carbon disulfide and then reused for the reaction with alkalicellulose to form the cellulose-xanthate in the preparation of the viscose spinning solution. The cost of the overall process is thereby substantially reduced and there is practically no waste of the trithiane by-product as in previous processes.

The invention is hereby claimed as follows:

1. A process for the conversion of trithiane into carbon disulfide which comprises reacting said trithiane with molten sulfur at a temperature of about 180° C. to 250° C., withdrawing the volatilized reaction products and separating carbon disulfide therefrom.

2. A process as claimed in claim 1 wherein the carbon disulfide is purified by fractional distillation.

3. A process as claimed in claim 1 wherein said reaction is carried out under superatmospheric pressure up to about 10 atmospheres.

4. A process as claimed in claim 1 wherein said reaction is carried out at a temperature of about 220° C. to 230° C.

5. A process as claimed in claim 1 wherein said reaction is carried out in the presence of a catalytic amount of a water-free compound of the formula $MeR_n$ wherein Me represents a metal selected from the group consisting of alkali metals and alkaline earth metals, R represents a member selected from the group consisting of oxygen, hydroxy and inorganic and organic anions forming a salt with said metal, and $n$ represents an integer of 1 to 2, inclusive, with the proviso that said compound in a normal aqueous solution exhibits a pH-value of about 9 to 14.

6. A process as claimed in claim 5 wherein said catalyst is added to the reaction mixture in an amount of about 0.01 to 1% by weight, with reference to the amount of trithiane.

7. A process as claimed in claim 6 wherein said reaction is carried out under superatmospheric pressure up to about 15 atmospheres.

8. A process as claimed in claim 7 wherein the reaction temperature is about 200° C. to 230° C.

9. A process as claimed in claim 1 wherein said reaction is carried out in a continuous operation, the vaporous reaction products being conducted in countercurrent flow to molten sulfur.

10. A process as claimed in claim 9 wherein said reaction is carried out at normal pressure.

11. A process as claimed in claim 10 wherein said reaction is carried out at a temperature of about 220° C. to 230° C.

12. A process as claimed in claim 10 wherein said trithiane is reacted with an excess of sulfur.

13. A process as claimed in claim 10 wherein volatilized reaction products consisting essentially of carbon disulfide and hydrogen sulfide are continuously withdrawn, the carbon disulfide is separated from said reaction products and the hydrogen sulfide is oxidized into sulfur which is then recycled for said reaction with said trithiane.

References Cited

UNITED STATES PATENTS

| | | | |
|---|---|---|---|
| 2,079,543 | 5/1937 | Bley | 23—206 |
| 2,391,541 | 12/1945 | Belchetz | 23—206 |
| 2,492,719 | 12/1949 | Thacker | 23—206 |
| 3,007,764 | 11/1961 | Gage | 264—170 |

OSCAR R. VERTIZ, *Primary Examiner.*

G. PETERS, *Assistant Examiner.*